Feb. 18, 1941.   R. H. ANDERSON   2,232,090
OVERRUNNING CLUTCH
Filed Dec. 14, 1938   2 Sheets-Sheet 2

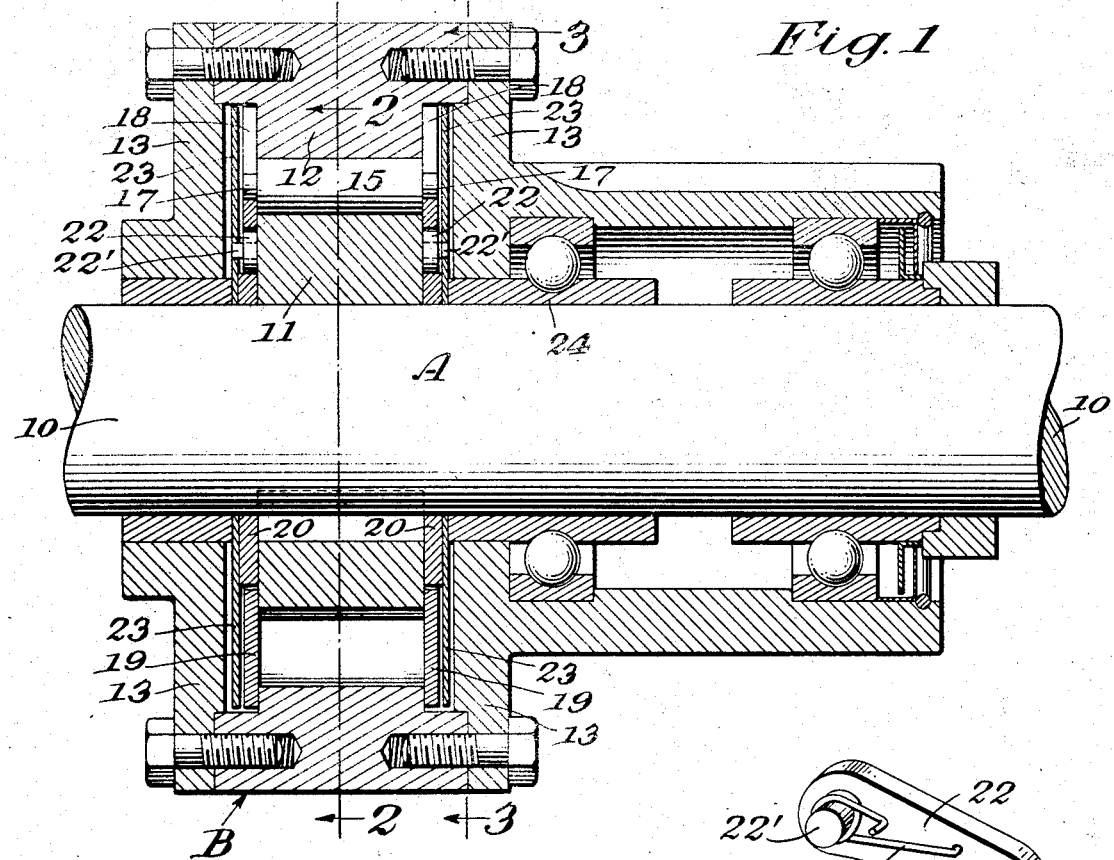
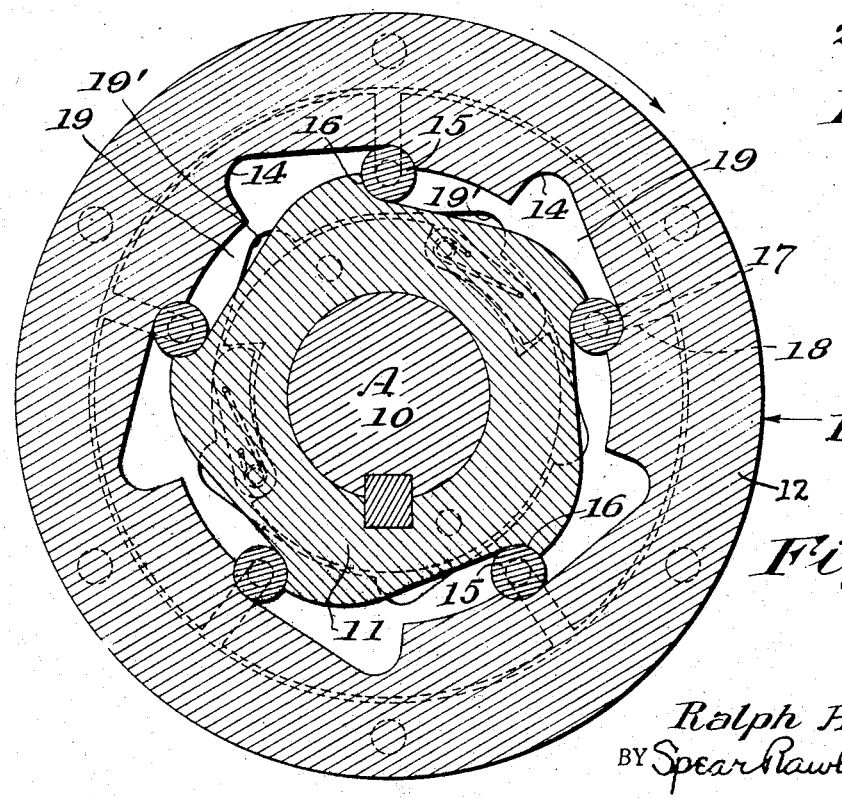

INVENTOR.
Ralph H. Anderson
BY Spear Rawlings & Spear
ATTORNEYS.

Patented Feb. 18, 1941

2,232,090

UNITED STATES PATENT OFFICE 2,232,090

OVERRUNNING CLUTCH

Ralph H. Anderson, Boston, Mass., assignor to Kinney Manufacturing Company, Jamaica Plain, Mass., a corporation of Massachusetts Application December 14, 1938, Serial No. 245,553

7 Claims. (Cl. 192—45)

This invention relates to clutches of the type in which the driven element is free to over-run the driving element, and has for its general object to provide a clutch of this type with improved means for establishing a driving relationship between the driving and the driven elements, both upon starting of the driving element when the driven element is at rest and whenever, following over-running of the driving element by the driven element, the relative speeds of the driving and driven elements become such that the driving element tends to rotate faster than the driven element.

More particularly, the object of the invention is to provide a clutch of the type mentioned with a simple, practical means which is operably responsive to any tendency of the driving element to rotate faster than the driven element, regardless of the speed of the latter, to accomplish the purpose stated, thereby to eliminate any necessity of springs or equivalent devices in such clutches and to assure driving of the driven element by the driving element the instant the speed of the driving element exceeds the speed of the driven element, regardless of the speed of the driven element.

With the foregoing and other objects in view, which will become more fully apparent as the nature of the invention is better understood, the invention consists in the novel features of construction, combination and arrangement of parts as will be hereinafter more fully described, illustrated in the accompanying drawings and defined in the appended claims.

In the accompanying drawings, wherein like characters of reference denote corresponding parts in the different views—

Figure 1 is a central, longitudinal section through a clutch constructed in accordance with one practical embodiment of the invention.

Figure 2 is a partial transverse section through the clutch, on the line 2—2, of Fig. 1, illustrating the relationship of the parts thereof when the driving element is driving the driven element.

Figure 5 shows one of the ratchet members and its spring and pin removed.

Figure 3:
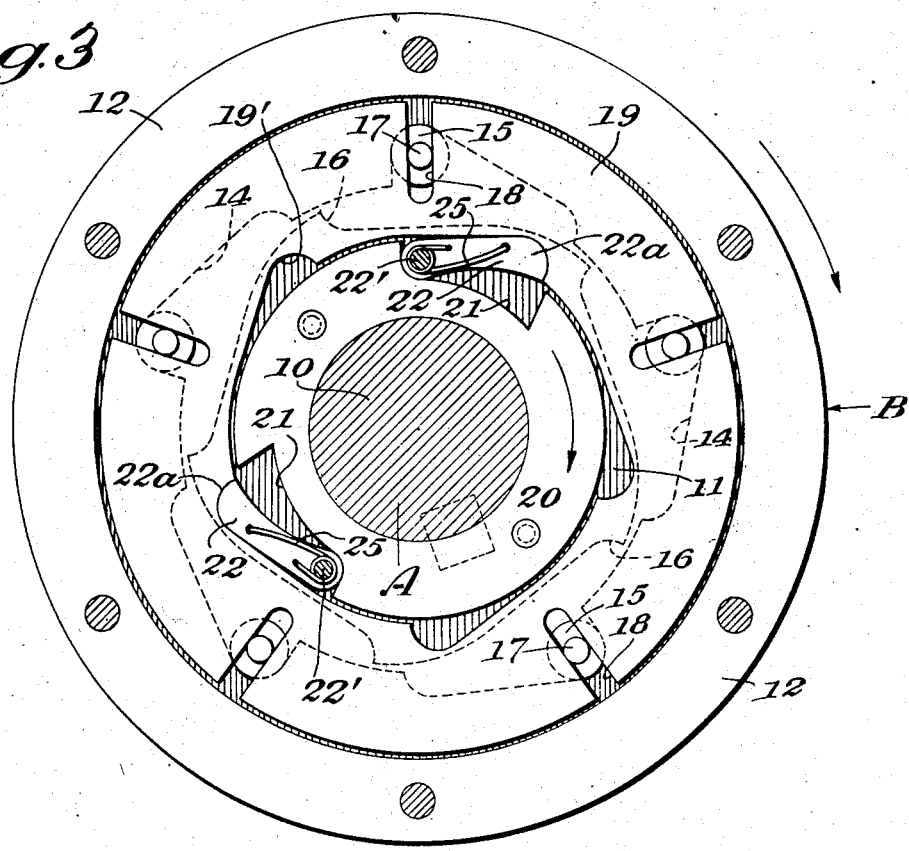
Figure 3 is a view looking toward the left-hand side of the clutch along the lines 3—3 in Fig. 1 with the right-hand cover plate removed and illustrating the relationship of the parts of the clutch when the driven element is over-running the driving element or when the driving element is rotating faster than the driven element prior to the relative positioning of the parts as indicated in Fig. 2.

Referring in detail to the practical embodiment of the invention illustrated in the drawings, A designates, generally, the driving element of the present clutch and B designates, generally, the driven element thereof.

In the present instance the driving element A is illustrated as comprising a rotatable shaft 10 carrying a body 11 and the driven element B is illustrated as comprising an annulus 12 surrounding the body 11 and having end closure plates 13, 13 journaled upon the shaft 10 whereby said driven element is supported for rotation relative to said driving element. However, within the purview of the invention, this specific structural arrangement may be varied in many respects, as will hereinafter become more fully apparent, since the only essential, insofar as concerns the particular type of clutch illustrated, is that there shall be an annulus, such as the annulus 12, surrounding the body 11 and rotatable with respect thereto.

In accordance with the particular embodiment of the invention illustrated in the present instance the annulus 12 has formed in its inner face a series of recesses 14 which extend from side to side of said annulus and which are spaced equal angular distances apart. There may be any desired number of the recesses 14 and each of them accommodates a related roller 15 which extends transversely of the annulus. Moreover, the recesses 14 are shallower at their leading ends than at their trailing ends as regards the direction of rotation of the annulus 12, and at their leading ends they are of lesser depths than the diameter of the rollers 15, while at their trailing ends they are at least as deep as the diameter of the rollers 15. Accordingly, when the rollers 15 are located in the leading ends of the recesses 14 they project inwardly beyond the inner periphery of the annulus 12. On the other hand, when the rollers 15 are located in the trailing ends of the recesses 14 they are disposed entirely outwardly of the inner periphery of the annulus 12.

While the body 11 may have a circular outer face, it preferably is provided with a series of shoulders 16 which face the direction of rotation of said body and which are equal in number to and have the same angular spacing as the recesses 14. If the outer face of the body 11 is circular the clearance between its outer face and the inner periphery of the annulus 12 is less than the amount which the rollers 15 project inwardly beyond the said inner periphery of the annulus when said rollers are in the leading ends of the recesses 14. If, on the other hand, the body 11 is provided with shoulders 16, the clearance between the outer limits of said shoulders and the inner periphery of the annulus 12 is less than the amount which the rollers 15 project inwardly beyond the inner periphery of said annulus when said rollers are in the leading ends of the recesses 14. Thus, in case the outer face of the body 11 is circular, shifting of the rollers 15 toward the shallower, leading ends of the recesses 14 will result in said rollers being wedged against the outer face of the body 11 and establishing a frictional driving connection between said body and the annulus 12, which frictional driving connection will be intensified by tendency of the body 11 to rotate faster than the annulus 12. On the other hand, in case the shoulders 16 are provided, there obviously will be a positive driving connection through said shoulders, the rollers 15 and the walls defining the shallower, leading ends of the recesses 14, between the body 11 and the annulus 12 when the rollers are disposed in the leading ends of the recesses 14. Moreover, in either case, if the speed of the annulus 12 should, for any reason, exceed the speed of the body 11, the rollers 15, due to their engagement with the body 11 and to centrifugal force, will be shifted from the shallower to the deeper ends of the recesses 14 where they will be disposed entirely out of the path of rotation of the body 11, so that over-running of the annulus with respect to the body 11 will in no way be impeded by said rollers.

No novelty is claimed respecting the structure so far described, since the same is well known, whether the body 11 is peripherally circular or is provided with shoulders such as shown. On the contrary, the present invention is concerned with the problem of returning the rollers 15, or their equivalents, to their operative positions at the shallower, leading ends of the recesses 14 to re-establish the drive between the body 11 or driving element of the clutch and the annulus 12 or driven element of the clutch whenever, for any reason, the driven element has over-run the driving element and subsequently the speed of the driving element tends to exceed the speed of the driven element. In this connection, unless some means other than gravity is relied upon to return the rollers to their operative positions, they will be held in their inoperative positions by centrifugal force until this force is overcome by gravity, which obviously means that re-establishment of the drive will not occur until the over-running driven element has decelerated to some definite slow speed. To meet this problem it has heretofore been proposed to employ springs to urge the rollers from their inoperative to their operative positions. If, however, the springs employed are sufficiently strong to overcome the centrifugal force acting upon the rollers, the rollers undesirably are urged into engagement with the driving element and undue wear and noise results whenever the driven element over-runs the driving element. On the other hand, if the springs employed are not sufficiently strong to overcome the centrifugal force acting upon the rollers, the result is the same as if no springs at all were employed, except that re-establishment of the drive will occur at some certain speed of the driven element greater than in the instance where no springs are employed.

According to the present invention, re-establishment of the drive following over-running of the driven element desirably and advantageously occurs regardless of the speed of the driven element the instant the speed of the driving element tends to exceed the speed of the driven element.

On the ends of the rollers 15 are trunnions 17 which are disposed in radial slots 18 in a pair of rings 19, one located at each side of the annulus 12. There are three or more of the rollers 15 and the trunnions 17 fit neatly in the slots 18. The rings 19 are thus supported concentrically with respect to the annulus 12 and, of course, are rotatable with the rollers 15. Moreover, the rings 19 are rotatable relative to the annulus 12 and are rotated relative thereto in one direction by the rollers 15 when the latter are shifted from the shallower, leading ends of the recesses 14 to the deeper, trailing ends thereof. Accordingly, by rotating said rings in the opposite direction, relative to the annulus when the rollers are disposed in the deeper, trailing ends of the recesses 14, said rollers are shifted toward the shallower, leading ends of said recesses.

Within the rings 19 are disk-like elements 20 which are fixed with respect to the body 11 for rotation therewith. These elements 20 have suitable clearances from the inner peripheries of said rings and also have peripheral recesses 21 the walls defining the bottoms of which extend circumferentially. These recesses are closed at their leading ends as regards the direction of rotation of the driving element A and afford plural shallow pockets arcuately extending about the disk-like element 20 from leading to trailing ends. A ratchet 22 is supported in each recess or pocket 21 by trunnions 22' supported by the plates 23.

Figure 4:
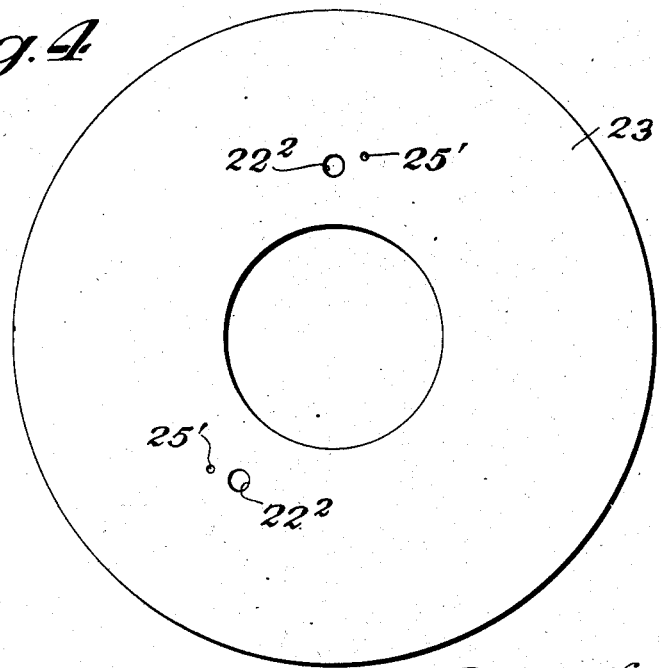
Figure 4 is an elevation of one of a pair of plates employed for maintaining parts of the clutch in operative assembly with other parts of the clutch.

In the form shown, the inner faces of the plates 23 are utilized to provide bearings $22^2$ for the trunnions 22' of the ratchet 22, the free ends of which are rounded off slightly and made somewhat heavier as at $22^a$. Light springs 25 are in control of the ratchets 22 and are preferably just sufficient to counteract or compensate for the effect of gravity on a ratchet 22 when in inverted position to hold the ratchets 22 within their recesses 24 until projected therefrom by centrifugal force. These may be of wire made with a few turns or coils about the pins 22' and having a longer arm anchored in the ratchet 22 adjacent its free end $22^a$. The opposite end of the spring 25 may be anchored in the adjacent face of the plate 23 in a small hole 25' as appears in Fig. 4, or the anchorage and bearings may be in the oppositely faced ends of the body 11. These and other functions of this plate will be apparent from their relation in the assembly.

The inner face of the ring 19 is formed with a plurality of ratchet receiving pockets 19'. These should be of the same number and spacing as the rollers 15 in order to insure return to normal position whether the clutch is running at very high speeds or at comparatively slow rotative rate.

From the foregoing it will be apparent that during normal operation of the clutch, that is, when the driving element A is driving the driven element B, ratchets 22 cannot be projected by centrifugal force out of the recesses 21 and simply will be carried around with the driving and driven elements without performing any function as shown in Fig. 2. It will also be apparent that these ratchets will not interfere in any way with over-running of the driven element B relative to the driving element A, since any rotation of plates 19 by the driven element at a speed in excess of the speed of the driving element will tend to press the ratchets 22 into the depper, leading ends of the recesses 21 where they allow the rings 19 to rotate freely around them. On the other hand, it will be equally apparent that, whenever the driving element A rotates faster than the driven element B, the ratchets 22 will, due to their inertia and under the action of centrifugal force, be projected out of the recesses 21. This results in the ends 22ª becoming engaged in the pockets 19' on the inner peripheries of the rings 19 with the result that the rings 19 will be positively clutched to the driving element A and will be caused to rotate with it and to be rotatably advanced relative to the more slowly rotating driven element B. Consequently, the rollers 15 will be shifted from the deeper, trailing ends of the recesses 14 toward the shallower, leading ends of the recesses 14 where they will be effective to establish a driving connection between the body 11 or driving element A and the annulus 12 or driven element B. This action obviously will occur whenever the driving element A rotates faster than the driven element B regardless of the speed of the driven element B. Accordingly, whenever the driven element B over-runs the driving element A and the speed of the driving element A subsequently exceeds the speed of the driven element B, the driving connection between the driving element A and the driven element B will be re-established regardless of the speed of the driven element B.

The rings 19, the disk-like elements 20, the ratchets 22 and plates 23 to retain the ratchets 22 in their recesses 21, are contained within chambers provided between the sides of the body 11 and the annulus 12 and the end closure plates 13, 13. The plates 23 are fast to the disk-like elements 20. They may be in the form of wide rings and may have their inner marginal portions confined between the disk-like elements 20 and bearings 24 by which the end closure plates 13 are journaled on the shaft 10. The elements 20 are slightly thicker than the rings 19 and the ratchets 22, so that said plates 23 have slight clearances from said rings and ratchets to permit free movement of the latter.

The disk-like elements 20 may be keyed to the shaft 10 or they may be riveted or otherwise suitably fastened against the opposite side faces of the body 11. Alternatively, the recesses 21 may be formed directly in the sides of the body 11. In fact, it will be apparent that the structure illustrated may be modified in many respects, all within the spirit and scope of the invention as defined in the appended claims.

As at first indicated, clutch devices in accordance with my invention are adapted to a very wide field of service and will only need to be redesigned by those engineers who are assigned to such tasks to meet the requirements of any new instance of use or installation.

I claim:

1. A driving element, a driven element, a first clutch means having a normal status inter-connecting said elements for driving of said driven element by said driving element and operable responsive to over-running of the driven element relative to the driving element to a status freely permitting such over-running, and a second clutch means operable responsive only to the speed of the driving element exceeding the speed of the driven element to initiate positively the normal status of said first mentioned clutch means.

2. A clutch comprising a rotatable driving element, a rotatable driven element surrounding said driving element, members between said elements, said driven element having recesses in its inner face in which said members are disposed, said recesses each being deeper at one end than at the other end and being of such depths at their respective ends that when said members are in the shallower ends thereof they contact the driving element and establish a driving connection between said elements and when said members are in the deeper ends thereof they permit free relative rotation of said elements, said recesses being disposed so that said members are movable into the deeper ends thereof by over-running of the driven element relative to the driving element, and clutch means between said members and said driving element comprising parts constructed and arranged to be inoperative when the driving element is driving the driven element and when the driven element is over-running the driving element and to be engaged by the speed of the driving element exceeding the speed of the driven element and, when engaged to shift said members from the deeper to the shallower ends of said recesses.

3. A clutch comprising a rotatable driving element, a rotatable driven element surrounding said driving element, rolling bodies between said elements, said driven element having recesses in its inner face in which said rolling bodies are disposed, said recesses each being deeper at one end than at the other and being of such depths at their respective ends that when said bodies are in the shallower ends thereof they contact the driving element and establish a driving connection between said elements and when said bodies are in the deeper ends thereof they permit free relative rotation of said elements, said recesses being disposed so that said bodies are shiftable into the deeper ends thereof by over-running of the driven element relative to the driving element, a ring operatively connected with said bodies and circumferentially shiftable relative to said driven element to be shifted in one direction by shifting of said bodies from the shallower to the deeper ends of said recesses and to be shifted in the other direction to return said bodies from the deeper to the shallower ends of said recesses, and means driven with the driving element ineffective to shift said ring relative to said driven element when the speed of the latter is greater than the speed of the driving element and rendered effective responsive to the speed of the driving element exceeding the speed of the driven element and by frictional cooperation with the inner edge of said ring to shift the latter in a direction to shift said bodies from the deeper to the shallower ends of said recesses.

4. A clutch comprising a rotatable driving element, a rotatable driven element surrounding said driving element, rolling bodies between said elements, said driven element having recesses in its inner face in which said rolling bodies are disposed, said recesses each being deeper at one end than at the other and being of such depths at their respective ends that when said bodies are in the shallower ends thereof they contact the driving element and establish a driving connection between said elements and when said bodies are in the deeper ends thereof they permit free relative rotation of said elements, said recesses being disposed so that said bodies are shiftable into the deeper ends thereof by overrunning of the driven element relative to the driving element, a ring operatively connected with said bodies and circumferentially shiftable relative to said driven element to be shifted in one direction by shifting of said bodies from the shallower to the deeper ends of said recesses and to be shifted in the other direction to return said bodies from the deeper to the shallower ends of said recesses, said ring having spaced peripheral ratchet engageable shoulders, a disc rotatable with said driving element and having spaced peripheral ratchet receiving pockets, ratchets pivotally mounted in said ratchet receiving pockets for ratcheting engagement with said ratchet shoulders only when the speed of the driving element exceeds the speed of the driven element and ineffective when the speed of the driven element exceeds the speed of the driving element, thereby to permit free over-running of the driven element relative to the driving element and to cause said ring to be shifted to shift said rolling bodies from the deeper to the shallower ends of said recesses to re-establish the drive between said driving element and said driven element following over-running of the driven element relative to the driving element and subsequent speed of the driving element in excess of the speed of the driven element.

5. A clutch unit comprising a rotatable drive element including an exposed shoulder, a driven element rotatable independently of said drive element and having a pocket establishing an internal shoulder and an exposed shoulder, clutch means in said pocket adapted to interlock said elements only when in contact with both of said exposed shoulders, guide means for said clutch means rotatable independently of said drive element and rotatable by said driven element only when the speed of the driven element exceeds the speed of the drive element to permit said clutch means to disengage with said external shoulders and to be carried by centrifugal force into said pocket into engagement with said internal shoulder, and means to rotate said guide means with said drive element when the speed of said drive element exceeds the speed of said driven element to carry said clutch means into contact with the exposed shoulder on said driven element.

6. A driving element, a driven element, clutch means having a normal status interconnecting said elements and operably responsive to over-running of said driven element relative to said driving element to a status permitting such over-running, and means operably responsive only to the speed of the driving element to initiate positively the normal status of said clutch means, said means establishing the normal status of said clutch means including ratchets, said driving element having pockets in which said ratchets are pivotally mounted, said ratchets normally lying in said pockets but having a free end positively to contact the establishing means by centrifugal force.

7. A driving element, a driven element, clutch means having a normal status interconnecting said elements and operably responsive to over-running of said driven element relative to said driving element to a status permitting such over-running, and means operably responsive only to the speed of the driving element to initiate positively the normal status of said clutch means, said means establishing the normal status of said clutch means including ratchets, said driving element having pockets in which said ratchets are pivotally mounted, said ratchets normally lying in said pockets but having a free end positively to contact the establishing means by centrifugal force, and gravity compensating springs to assist a ratchet to lie in its pocket when in inverted position.

RALPH H. ANDERSON.